US010122726B2

(12) United States Patent
Niemoeller et al.

(10) Patent No.: US 10,122,726 B2
(45) Date of Patent: Nov. 6, 2018

(54) METHODS AND APPARATUS FOR CONTROLLING PERMISSIONS TO BE GRANTED TO APPLICATIONS ON USER EQUIPMENT RESPONSIVE TO USER PRIVACY PROFILES

(75) Inventors: Joerg Niemoeller, Sundbyberg (SE); Stefan Avesand, Huddinge (SE); Leonid Mokrushin, Uppsala (SE); Farjola Peco, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 233 days.

(21) Appl. No.: 14/424,097

(22) PCT Filed: Aug. 30, 2012

(86) PCT No.: PCT/IB2012/001679
§ 371 (c)(1),
(2), (4) Date: Feb. 26, 2015

(87) PCT Pub. No.: WO2014/033492
PCT Pub. Date: Mar. 6, 2014

(65) Prior Publication Data
US 2015/0249673 A1 Sep. 3, 2015

(51) Int. Cl.
*H04L 29/06* (2006.01)
*H04W 12/08* (2009.01)
(Continued)

(52) U.S. Cl.
CPC ............ *H04L 63/102* (2013.01); *G06F 8/61* (2013.01); *G06F 21/6245* (2013.01);
(Continued)

(58) Field of Classification Search
CPC ....... H04L 63/102; H04L 63/10; H04L 67/30; H04L 67/306; H04L 67/34;
(Continued)

(56) References Cited

U.S. PATENT DOCUMENTS

2007/0004393 A1* 1/2007 Forsberg ............... H04L 63/102
455/420
2011/0252119 A1* 10/2011 Chiu ................. H04M 1/72525
709/221
(Continued)

*Primary Examiner* — Hadi S Armouche
*Assistant Examiner* — Alexander R Lapian
(74) *Attorney, Agent, or Firm* — Rothwell, Figg, Ernst & Manbeck, P.C.

(57) ABSTRACT

Methods, network nodes, and user equipment nodes are disclosed that control the operation of applications on user equipment nodes. A method includes receiving user information that identifies a user of the user equipment node (120) and application information that identifies an application that the user has selected for installation on the user equipment node. A user profile is retrieved from a user profile repository (106) using the user information, and an application profile is retrieved from an application profile repository (104) using the application information. Settings configuration information is generated responsive to the user profile and the application profile, and indicates what permissions are to be granted to the application while operating on the user equipment node. The application and the settings configuration information is communicated to the user equipment node (120) for installation of the application and configuration of the permissions that are to be granted to the application during operation.

17 Claims, 9 Drawing Sheets

(51) Int. Cl.
*G06F 8/61* (2018.01)
*G06F 21/62* (2013.01)
*H04W 4/50* (2018.01)
*H04L 29/08* (2006.01)

(52) U.S. Cl.
CPC ............ *H04W 4/50* (2018.02); *H04W 12/08* (2013.01); *H04L 67/306* (2013.01)

(58) Field of Classification Search
CPC .. G06F 21/6218; G06F 21/6245; G06F 21/60; G06F 21/604; G06F 21/62; G06F 8/60; G06F 8/61; H04W 12/081; H04W 12/02; H04W 12/08; H04W 4/001; H04W 4/003; H04W 4/50
See application file for complete search history.

(56) References Cited

U.S. PATENT DOCUMENTS

| | | | |
|---|---|---|---|
| 2012/0072991 A1 | 3/2012 | Belani et al. | |
| 2012/0124028 A1* | 5/2012 | Tullis | G06F 8/60 707/711 |
| 2012/0129503 A1* | 5/2012 | Lindeman | H04W 4/001 455/414.1 |
| 2012/0185912 A1 | 7/2012 | Lee et al. | |
| 2013/0067473 A1* | 3/2013 | Olson | G06F 9/445 718/100 |
| 2013/0298185 A1* | 11/2013 | Koneru | G06F 15/173 726/1 |
| 2013/0305379 A1* | 11/2013 | Udani | G06F 21/51 726/26 |

\* cited by examiner

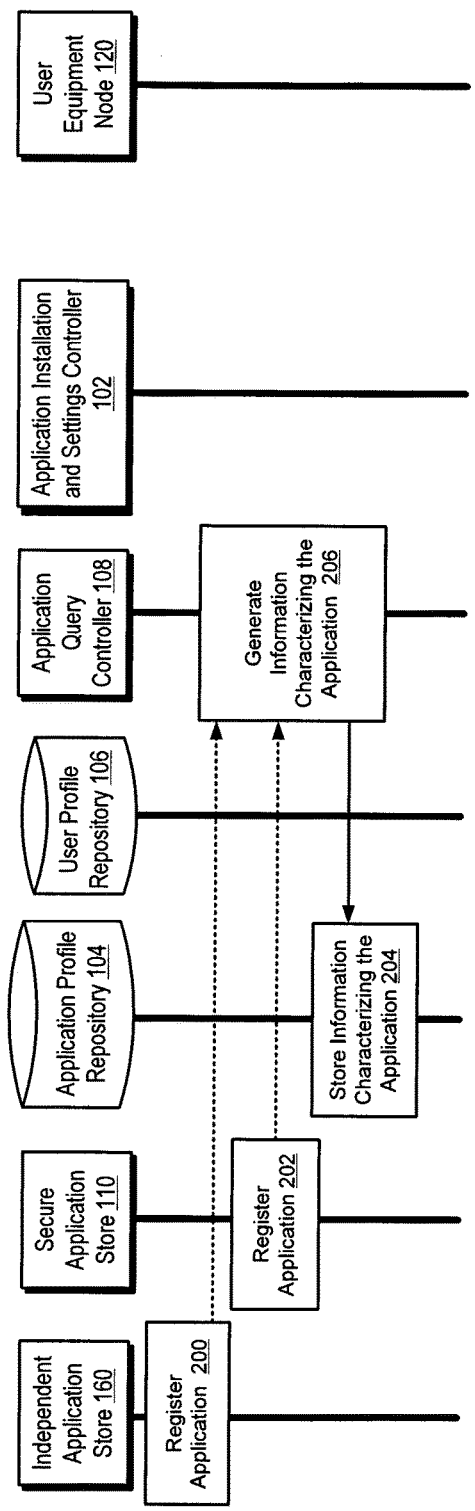
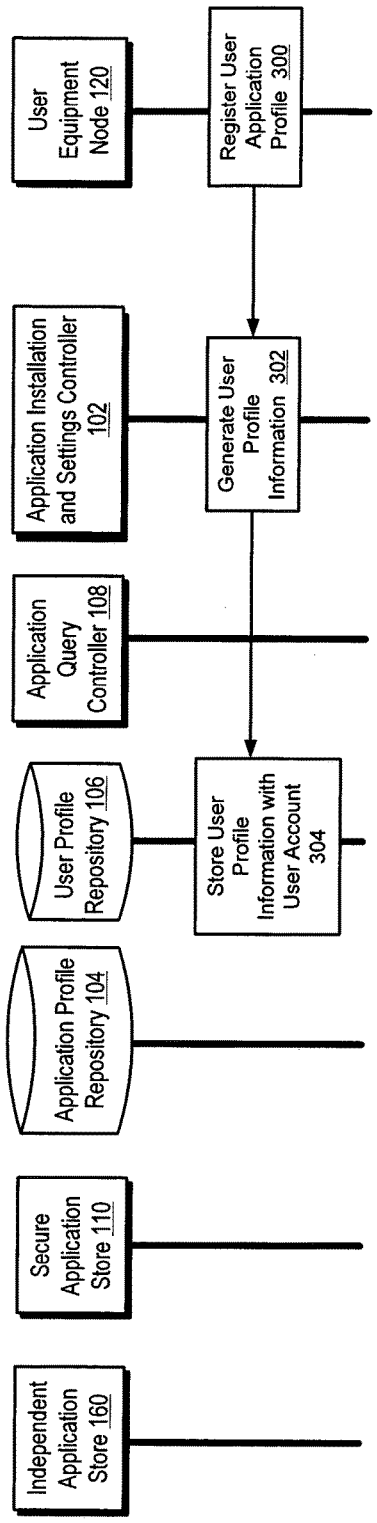
FIGURE 2
FIGURE 3

METHODS AND APPARATUS FOR CONTROLLING PERMISSIONS TO BE GRANTED TO APPLICATIONS ON USER EQUIPMENT RESPONSIVE TO USER PRIVACY PROFILES

CROSS REFERENCE TO RELATED APPLICATION(S)

This application is a 35 U.S.C. § 371 National Phase Entry Application from PCT/IB2012/001679, filed Aug. 30, 2012, the disclosure of which is incorporated by reference.

TECHNICAL FIELD

The present disclosure relates to communication networks and, more particularly, to controlling the distribution and operation of applications on user equipment nodes.

BACKGROUND

Increasingly, users install a wide range of applications (also commonly referred to as "apps") on a wide range of hardware platforms. For example, users install applications on cellular telephones—sometimes called "smart phones"—for literally thousands of purposes. Such applications may be downloaded from a "marketplace" or "application store," which may be configured as a single organization, typically managed by a cellular telephone service provider or device manufacturer. Accordingly, a cellular telephone provider is able to serve applications (both free and paid) to a captive audience of cellular subscribers. Other device types (TVs, etc.) may be similarly managed to receive applications from a single source.

The downloading process typically involves a user opening the marketplace application and entering a key word that is to be used to search for a desired application. Alternatively, the user may select among buttons representing categories of applications, such as "games" or "featured." In either case, the user is presented with a listing of applications from which to choose.

This system is problematic for many reasons. Once installed, an application can access or attempt to access any or all resources that are available on or through the user equipment. For example, an application may access the user's private contact information, determine the user's location, track the user's typing or data entering into other applications, and share information or seek information with others through one or more network connections (e.g., cellular, WiFi, etc.) provided by the user equipment. Some operating systems attempt to regulate what rights an application is granted, by querying the user for such permissions when the application is granted. However, some users may not adequately consider such queries when responding, or may not understand the possible unacceptable consequences of providing permission for an application to have various resource rights. For these and other reasons, the present processes for finding, installing, and controlling applications on user equipment nodes continues to be unreasonably burdensome to some users and can fail to sufficiently safeguard users' interests.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY

It may therefore be an object to address at least some of the above mentioned disadvantages and/or to provide improved control over the configuration and operation of applications on user equipment nodes.

One embodiment is directed to a method by at least one network node of an application control system for controlling operation of applications on user equipment nodes. The method includes receiving user information that identifies a user of the user equipment node and application information that identifies an application that the user has selected for installation on the user equipment node. A user profile is retrieved from among a plurality of user profiles in a user profile repository using the user information to identify the user profile. The user profile indicates the user's preferences for restricting access by applications to resources of the user equipment node. An application profile is retrieved from among a plurality of application profiles in an application profile repository using the application information to identify the application profile. The application profile indicates resources of the user equipment node that the application will access during operation. Settings configuration information is generated responsive to the user profile and the application profile, and indicates what permissions are to be granted to the application while operating on the user equipment node. The application and the settings configuration information is communicated through a data network to the user equipment node for installation of the application and configuration of the permissions that are to be granted to the application during operation.

A potential advantage of this approach is that a user can define various security, privacy, and other criteria preferences for restricting access by applications to resources, such as personal data, contact information, hardware components, and/or other applications that are part of and/or are accessible through the user equipment node. The user profile can be defined without being restricted for use with any one particular application, but instead can be used for any application that will be installed on the user equipment node. The user profile can then be used whenever an application in installed on the user equipment node to automate configure the application's settings so that the application operates in a manner that is acceptable to the user. Moreover, configuration of the application settings in this manner may be performed using a more exhaustive level of analysis than may be possible by a user who may know far less information as to the effect of various application settings on the resources that will be accessed by a particular application during operation.

Another embodiment is directed to a method by a user equipment node for controlling operation of applications on the user equipment node. The method includes receiving an application from at least one network node through a data network. Settings configuration information is received from the at least one network node. The settings configuration information indicates what permissions are to be granted to the application while operating on the user equipment node. The application is installed on the user equipment node to enable a user to initiate operation of the application through a user interface of the user equipment node. Permission settings are configured for the application, responsive to the settings configuration information, that restrict what resources of the user equipment node the application will be allowed to access during operation.

Another embodiment is directed to at least one network node that controls operation of applications on a user equipment node. The at least one network node includes a user profile repository, an application profile repository, and an application installation and settings controller. The user profile repository stores a plurality of user profiles, where each of the user profiles indicates a user's preferences for restricting access by applications to resources of a user equipment node. The application profile repository stores a plurality of application profiles, where each of the application profiles indicates resources of a user equipment node that an application will access during operation. The application installation and settings controller receives user information that identifies a user of a user equipment node and application information that identifies an application that the user has selected for installation on the user equipment node. The application installation and settings controller retrieves one of the user profiles from among the plurality of user profiles stored at the user profile repository using the user information to identify the user profile, and retrieves one of the application profiles from among the plurality of application profiles stored at the application profile repository using the application information to identify the application profile. The application installation and settings controller generates settings configuration information, responsive to the user profile and the application profile, that indicates what permissions are to be granted to the application while operating on the user equipment node. The controller communicates the application and the settings configuration information through a data network to the user equipment node for installation of the application and configuration of the permissions that are to be granted to the application during operation.

Other methods and apparatuses according to embodiments of the invention will be or become apparent to one with skill in the art upon review of the following drawings and detailed description. It is intended that all such additional methods and apparatuses be included within this description, be within the scope of the present invention, and be protected by the accompanying claims. Moreover, it is intended that all embodiments disclosed herein can be implemented separately or combined in any way and/or combination.

BRIEF DESCRIPTION OF THE DRAWINGS

The accompanying drawings, which are included to provide a further understanding of the disclosure and are incorporated in and constitute a part of this application, illustrate certain non-limiting embodiment(s) of the invention. In the drawings:

FIG. 2 is a data flow diagram illustrating example operations and methods for registering applications to generate application profiles, according to some embodiments;

FIG. 3 is a data flow diagram illustrating example operations and methods for generating user profiles, according to some embodiments;

DETAILED DESCRIPTION

The invention will now be described more fully hereinafter with reference to the accompanying drawings, in which embodiments of the invention are shown. This invention may, however, be embodied in many different forms and should not be construed as limited to the embodiments set forth herein.

Figure 1:
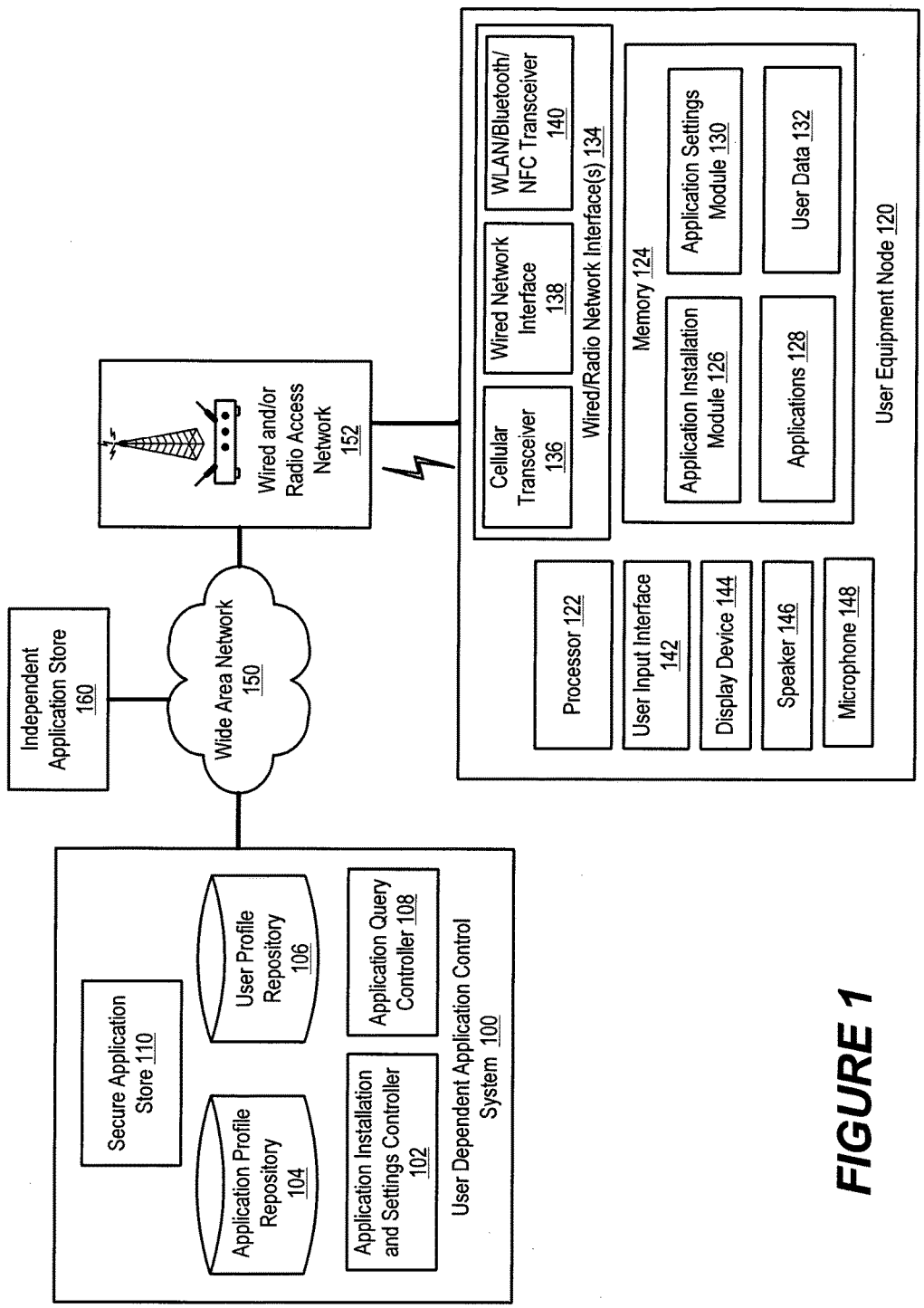
FIG. 1 is a block diagram of an application control system that is configured to operate according to some embodiments.

FIG. 1 is a block diagram of an application control system 100 that is configured to operate according to some embodiments. The application control system 100 can communicate with user equipment nodes 120 via a data network 150 (e.g., wide area network) and a wired and/or radio access network 152. The application control system 100 can contain information that indicates a user's preferences for privacy, security, and/or other user defined criteria, and can assist a user with selecting applications that satisfy those known user preferences. The system 100 can also download an application to the user equipment node 120 and can automatically configure the settings of the application to restrict the operation of the application on the user equipment node 120 in ways that satisfy the known privacy, security, and/or other defined preferences of the user.

The application control system 100 can include an application query controller 108 that determines what resources will be used by various applications during their operation on a user equipment node, and may further identify particular privacy and security problems that can occur during their operation. The application query controller 108 can generate an application profile for each of the applications, where the application profile indicates resources of a user equipment node that the application will access during operation. The application profiles can be stored in an application profile repository 104. The application query controller 108 may identify, for example, what resource rights an application needs in order to perform various identified modes of operation of the application, and may further identify resource rights that the application may seek but which are needed only for information collection and not for an operational mode that is provided to the user (e.g., background tracking of feature utilization for communication to an application developer without knowledge of the user). Resources of the user equipment node 120 can include, but are not limited to, personal data of the user, contact information (e.g., phonebook, email addresses, etc.), hardware components (e.g., network interface(s), camera, GPS/geographic location determining module), speaker device, microphone device, display device, etc.), and/or other applications that are part of and/or are accessible through the user equipment node.

The application control system 100 may provide a secure application store 110, which may be provided via a website and may show some or all of the same applications as an independent application store 160. Applications in the secure application store have been examined to determine their resource needs and privacy/security risks during their operation, and application profiles have been generated for each of the applications and stored in the application profile repository 104. In contrast, an independent application store 160, which can be networked through the data network 150 to the application control system 100, can contain applications that may not have been examined to identify their resource needs and privacy/security risks, and for which associated application profiles may have not been generated and stored in the application profile repository 104. User's may choose to download applications from either the secure application store 110 or the independent application store 160, however users may be charged a higher price for applications downloaded from the secure application store 110 because of the added value of the application analysis that has been performed and the automated configuration of application settings that will be described in more detail below.

A user may, for example, browse applications through the secure application store 110 to view privacy and security ratings and information associated with the various applications that have been examined, and to further view pricing of the applications. The secure application store 110 may warn a user about applications that are known to operate in a malicious or generally privacy invasive manner (e.g., uses the camera and/or microphone of the user equipment node without informing the user and/or without obtaining user permission). A user may choose to purchase an application through the secure application store 110 instead of the independent application store 160 because of the ability to automatically configured settings of a purchased application using the criteria that the user has defined in the user's profile. Moreover, applications that are listed by, or obtainable through, the secure application store 110 may be guaranteed to be free of malware and unwanted privacy breaching operations, and may be operationally compatible for use under the criteria that the user has defined in the user's profile.

FIG. 2 is a data flow diagram that illustrates example operations and methods for registering applications to generate application profiles, according to some embodiments. During an application registration process (blocks 200 and 202), the application query controller 108 can analyze applications in the secure application store 160, and may further analyze applications in the independent application store 110, to generate (block 206) information that characterizes what resources each application will access (e.g., to receive information from, send information to, and/or execute using) during operation on the user equipment node 120. The application query controller 108 stores (block 204) information characterizing the application in the application profile repository 104. The application profile repository 104 can store a plurality of application profiles, where each of the application profiles indicates resources of the user equipment node 120 that an application will access during operation.

Analysis of the applications may or may not be fully automated without human intervention. It is contemplated that in some embodiments, personnel of a security service provider will review applications to identify their resource preferences/requirements, and will generate at least a portion of the application profiles for the analyzed applications.

The application query controller 108 may copy the analyzed applications from the independent application store 110 to the secure application store 160. The secure application store 160 may therefore contain the same applications as the independent application store 110, when those applications have been analyzed. Alternatively, the application query controller 108 may create reference pointers to applications that have been analyzed in the independent application store 110 and store the reference pointers in the secure application store 160, which will allow a user to browse applications listed in the secure application store 110 and select an application that is to be downloaded, using the associated reference pointer, from the independent application store 110 to the user equipment node.

The application control system 100 can know a user's preferences for what privacy and security related information and resources can be accessible to applications during operation on the user equipment node. The system 100 can generate a user profile which defines those preferences, and may query the user through a question and answer message dialogue about what resources, information, and other privacy and security related operations are considered by the user to be acceptable during operation of an application on the user equipment node.

FIG. 3 is a data flow diagram illustrating example operations and methods for generating user profiles, according to some embodiments. The application control system 100 can include an application installation and settings controller 102. A user can operate the user equipment node 120 to log into the user's account and initiate registration (block 300) of a user application profile. The controller 102 can generate (block 302) user profile information that indicates the user's preferences for restricting access by applications to resources of the user equipment node 120. The controller 102 can store (block 304) the user profile information in the user profile repository 106 associated with an identifier for the user's account. The user profile repository 106 can store a plurality of user profiles, where each of the user profiles indicates a user's preferences for restricting access by applications to resources of the user equipment node 120.

The user profile information may be obtained by generating question prompts to the user and receiving responsive answers from the user through the data network 150 and the user equipment node 120 operated by the user. The questions may be defined to gauge the level of acceptability to the user if an application accesses defined types of information and/or applications (e.g., contact information, address information, geographic location information, user activity tracking, tracking information input to or output from the application and/or other applications, etc.), if an application accesses defined types of hardware resources of a user equipment node (e.g., cellular network interfaces, wired network interfaces, Bluetooth network interfaces, near field communication interfaces, and/or wireless local area network interfaces to allow communication by the network node outside the user equipment node, positioning modules such as GPS, removable memory module, etc.).

The user may be able to choose from among a plurality of sets of defined user profile information that are typically determined to be acceptable to users, or the user may be provided with a default set of user profile information that the user can modify in various manners to increase/decrease various privacy/security/other constraints on applications.

Figure 4:
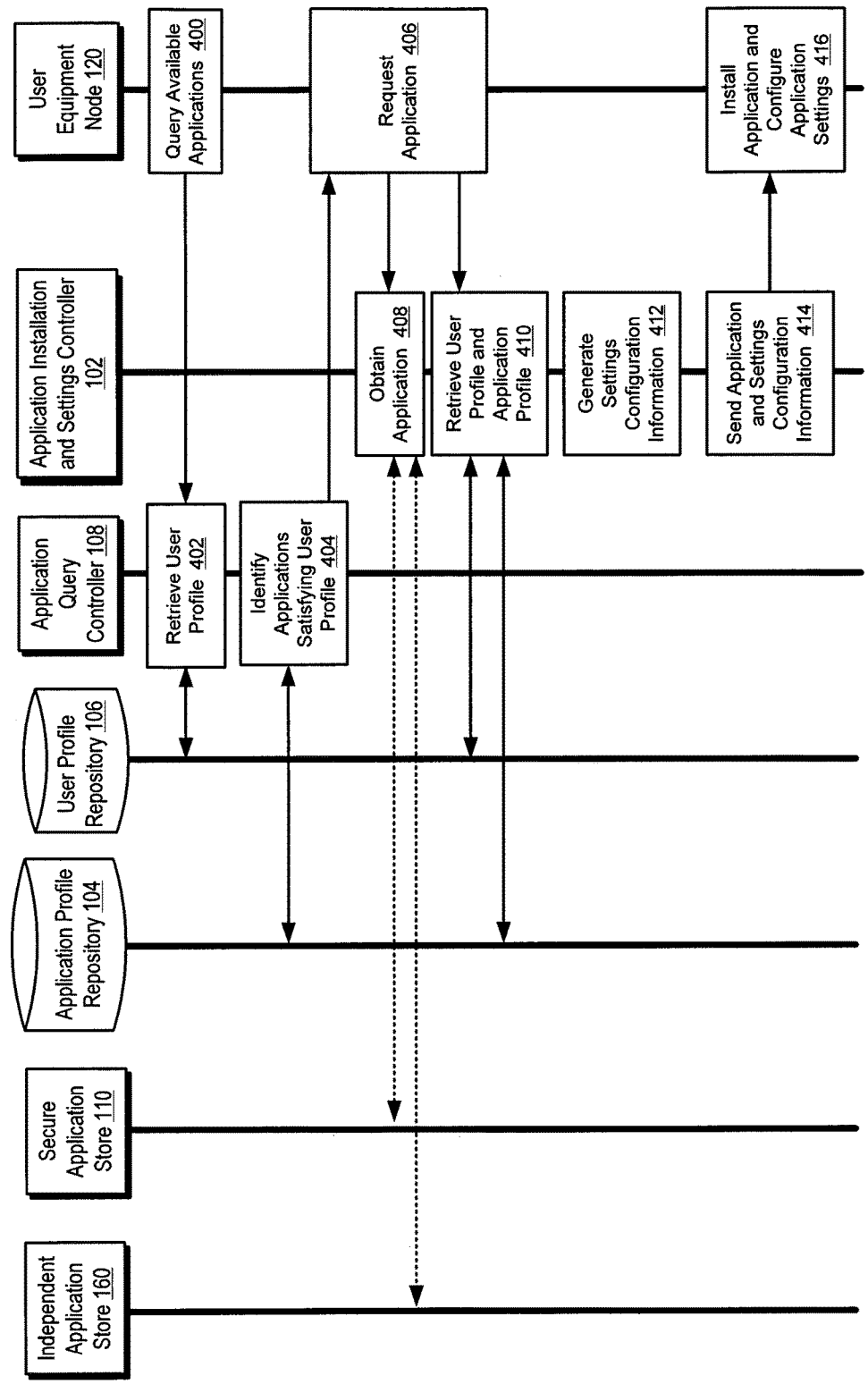
FIG. 4 is a data flow diagram illustrating example operations and methods for identifying applications, installing applications, and configuring application settings responsive to a user profile and an application profile, according to some embodiments.

FIG. 4 is a data flow diagram illustrating example operations and methods for identifying applications, installing applications, and configuring application settings responsive to a user profile and an application profile, according to some embodiments.

A user generates (block 400) an application query that identifies the user and at least one keyword that is to be searched to identify candidate applications for the user to download to the user equipment node 120. The application query controller 108 receives the query and retrieves (block 402) one of the user profiles from among the plurality of user profiles stored at the user profile repository 106 using the user information to identify the user profile. The user profile indicates the user's preferences for restricting access by applications to resources of the user equipment node 120. The application query controller 108 uses the user profile and application profiles in the application profile repository 104 to identify (block 404) applications that satisfy criteria defined by the user's profile.

The application query controller 108 may use the user profile to select between searching for applications within the secure application store 110, which can contain applications that have corresponding application profiles stored in the application profile repository 104, and the independent application store 160, which can contain applications that do not have corresponding application profiles stored in the application profile repository 104.

The application query controller 108 identifies (block 404) to the user equipment node 120 which applications satisfy criteria defined by the user's profile and which further satisfy conditions of the user's query (e.g., user defined search keywords, categories, etc.). The application query controller 108 can also warn the user when an application has one or more operational modes that have privacy and/or security issues that may be undesirable to a user. The application query controller 108 can also warn the user when the application will be constrained, by settings configurations which meet the user profile criteria, to one or more operational modes that provide less than full functionality and/or which provide reduced functionality operational modes.

For example, the application profile can indicate a plurality of modes of operation of the application, where each of the modes of operation has a different group of resources that the application will access during operation. The application query controller 108 can identify which, if any, of the operational modes satisfy the criteria defined by the user's profile, and can warn the user of which operational modes will be allowed and/or which operational modes will not be allowed when the application settings are configured pursuant to the criteria defined by the user's profile.

The user generates (block 406) an application request, via the user equipment node 120. The controller 102 receives the user information that identifies the user of the user equipment node (120) and application information that identifies the application that the user has selected for installation on the user equipment node 120. The application is obtained (block 408) from the secure application store 110 or the independent application store 160 (e.g., depending upon the user's profile). The user profile is retrieved (block 410) from among the plurality of user profiles in the user profile repository 106 using the user information to identify the user profile. The application profile is retrieved (block 410) from among a plurality of application profiles in the application profile repository 104 using the application information to identify the application profile. Settings configuration information is generated (block 412) responsive to the user profile and the application profile, where the settings configuration information indicates what permissions are to be granted to the application while operating on the user equipment node 120. The controller 102 communicates (block 414) the application and the settings configuration information through the data network 150 to the user equipment node 120.

The application profile may indicate a plurality of modes of operation of the application, where each of the modes of operation having a different group of resources that the application will access. The controller 102 can select among the modes of operation of the application indicated by the application profile, responsive to the user's preferences indicated by the user profile, and can generate the settings configuration information to indicate that a selected mode of operation having a corresponding group of resources is permitted to be granted to the application while operating on the user equipment node 120. When the controller 102 determines that none of the modes of operation of the application indicated by the application profile satisfy the user's preferences indicated by the user profile, it can communicate a message through the data network 150 to the user equipment node 120 informing the user that none of the modes of operation of the application indicated by the application profile satisfy the user's preferences indicated by the user profile in response to the determination.

The user equipment node 120 receives (block 416) the application and the settings configuration information, installs the application to enable user initiated operation of the application through a user interface of the user equipment node 120, and configures permission settings for the application that restrict what resources of the user equipment node 120 the application will be allowed to access during operation, responsive to the settings configuration information.

Accordingly, the application settings can be automatically configured by the user equipment node 120, without needing input from the user during such configuration, by using the settings configuration information which is generated by the application installation and settings controller 102. A user can therefore define various security, privacy, and/or other criteria when defining the user profile, and the user profile can then be used whenever installing an application on the user equipment node to automate configuration of the application settings so that the application operates in a manner that is acceptable to the user, as defined by the user profile criteria. Moreover, configuration of the application settings in this manner may be performed using a more exhaustive level of analysis than may be possible by a user who may know far less information as to the effect of various application settings on the resources that will be accessed by a particular application during operation.

Figure 5:
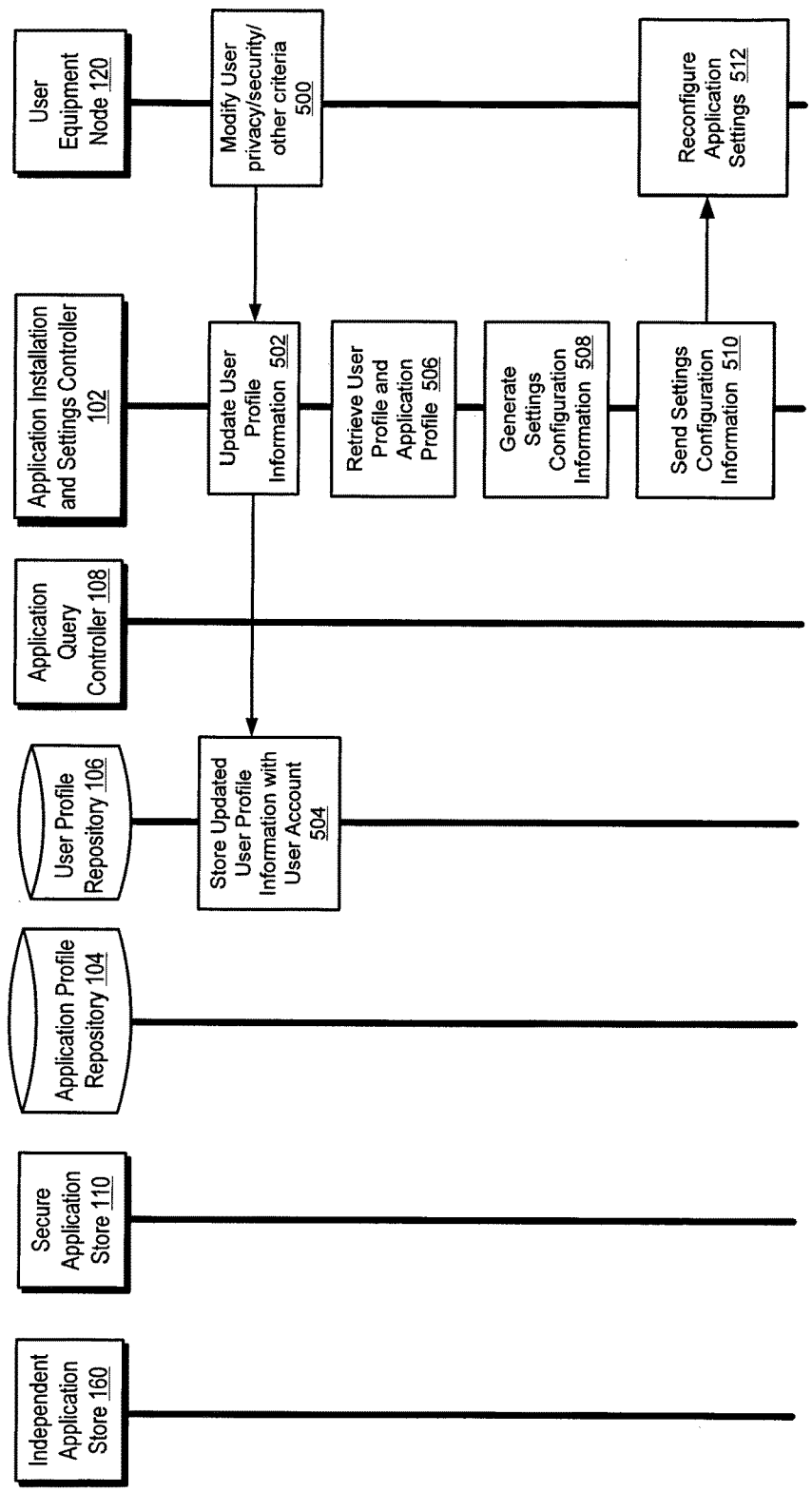
FIG. 5 is a data flow diagram illustrating example operations and methods for generating updated user settings and reconfiguring application settings responsive to the updated user settings, according to some embodiments.

When the user modifies any of the criteria that are defined by the user profile, the application installation and settings controller 102 can reconfigure the settings of any application that has been installed on the user equipment node 120 so that the applications operate with compliance with the updated user profile. FIG. 5 is a data flow diagram illustrating example operations and methods for generating updated user settings and reconfiguring application settings responsive to the updated user settings, according to some embodiments.

The user operates the user equipment node 120 to modify (block 500) the defined preferences for controlling privacy and security of information that can be accessible to applications during operation on the user equipment node 120, and communicate the modified criteria to the application installation and settings controller 102. The controller 102 receives (block 502) the updated privacy and security preferences information, from the user through the data network 150, and generates (block 502) an updated user profile responsive to the updated privacy and security preferences information. The updated user profile is stored (block 504) in the user profile repository 106 associated with the identifier for the user.

The controller 102 generates (block 508) updated settings configuration information, responsive to the updated user profile and the application profile, and communicates (block 510) the updated settings configuration information through the data network 150 to the user equipment node 120. The user equipment node 120 responds thereto by reconfiguring (block 512) the application settings permissions that are granted to the application during operation on the user equipment node 120. The system 100 and the user equipment node 120 may communicate through a secure communication channel using, for example, Extensible Markup Language (XML).

Further Example Operations and Methods

FIGS. 6-12 are flowcharts of operations and methods performed by one or more network nodes (e.g., the application installation and settings controller 102 and the application query controller 108 of the application control system 100) to control operation of an application on a user equipment node (e.g., the application equipment node 120) according to some embodiments.

Figure 6:
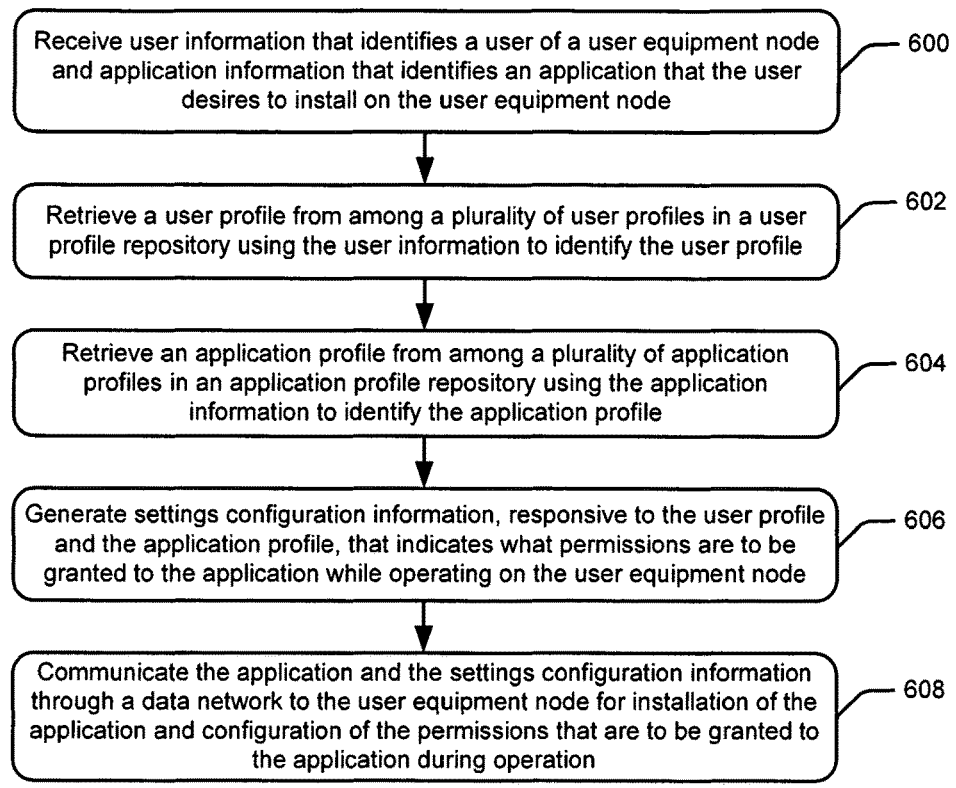
FIGS. 6-12 are flowcharts of operations and methods performed by one or more network nodes of an application control system to control operation of an application on a user equipment node, according to some embodiments.

Referring to FIG. 6, user information is received (block 600) by the network node that identifies a user of the user equipment node 120 and application information that identifies an application that the user has selected for installation on the user equipment node 120. The network node retrieves (block 602) a user profile from among a plurality of user profiles in the user profile repository 106 using the user information to identify the user profile. The user profile indicates the user's preferences for restricting access by applications to resources of the user equipment node 120. The network node retrieves (block 604) an application profile from among a plurality of application profiles in the application profile repository 104 using the application information to identify the application profile. The application profile indicates resources of the user equipment node 120 that the application will access during operation. The network node generates (block 606) settings configuration information, responsive to the user profile and the application profile, that indicates what permissions are to be granted to the application while operating on the user equipment node 120. The network node communicates (block 608) the application and the settings configuration information through a data network 150 to the user equipment node 120 for installation of the application and configuration of the permissions that are to be granted to the application during operation.

Figure 7:
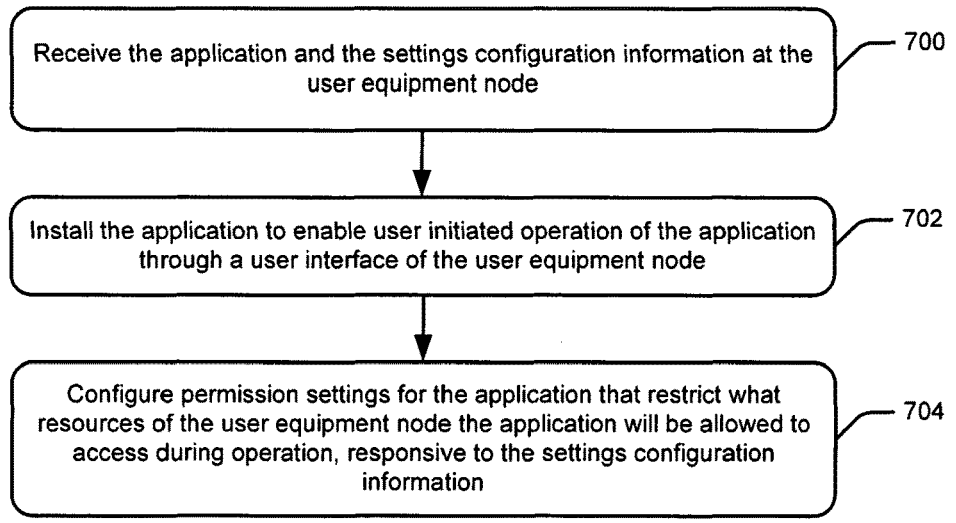

Referring to FIG. 7, the user equipment node 120 receives (block 700) the application and the settings configuration information, and installs (block 702) the application to enable user initiated operation of the application through a user interface of the user equipment node 120. The user equipment node 120 configures (block 704) permission settings for the application that restrict what resources of the user equipment node 120 the application will be allowed to access during operation, responsive to the settings configuration information.

Some further embodiments are directed to various types of information that can be communicated through an application profile, and to defining how that information can be used to control settings of the corresponding application.

In one embodiment, the application profile indicates a plurality of modes of operation of the application, where each of the modes of operation has a different group of resources that the application will access. For example, the application profile may indicate first, second, and third modes of operation by the application, where the first mode of operation of the application provides more functionality than the second and third modes of operation of the application, and where the first mode of operation of the application uses a first group of the resources that is a superset that includes second and third groups of the resources used, respectively, by the second and third modes of operation of the application.

Figure 8:
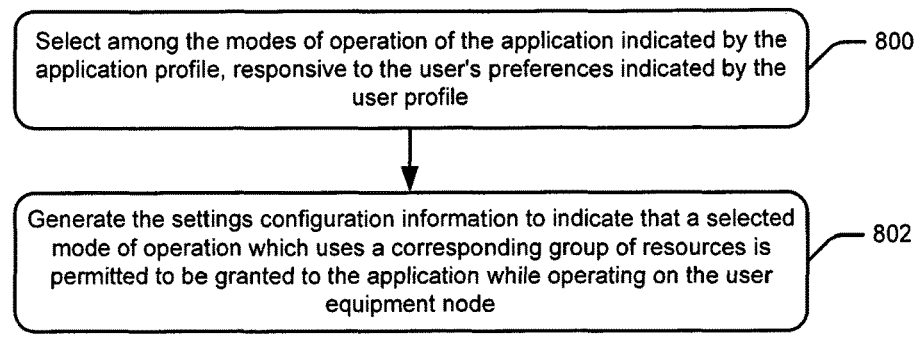

Referring to FIG. 8, generation of the settings configuration information can include selecting (block 800) among the modes of operation of the application indicated by the application profile, responsive to the user's preferences indicated by the user profile, and can further include generating (block 802) the settings configuration information to indicate that a selected mode of operation which uses a corresponding group of resources is permitted to be granted to the application while operating on the user equipment node 120.

Generation of the settings configuration information can further include indicating that a non-selected one or more modes of operation using a correspond one or more groups of resources are not permitted to be granted to the application while operating on the user equipment node 120.

Figure 9:
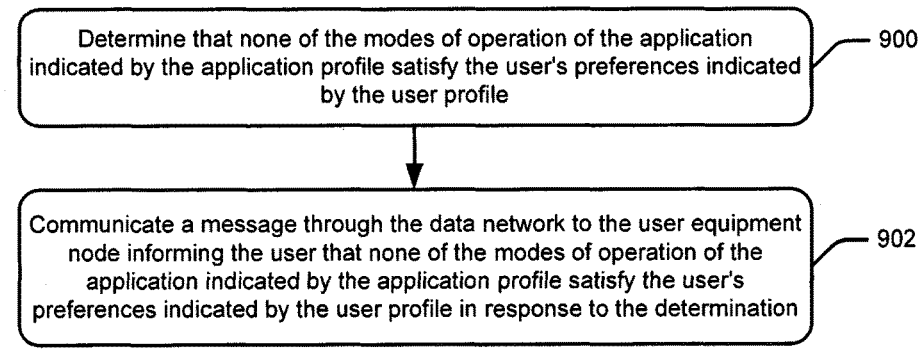

Referring to FIG. 9, the system 100 can inform a user when no applications satisfy the criteria defined by the user profile. The method and operation can include determining (block 900) that none of the modes of operation of the application indicated by the application profile satisfy the user's preferences indicated by the user profile, and communicating (block 902) a message through the data network 150 to the user equipment node 120 informing the user that none of the modes of operation of the application indicated by the application profile satisfy the user's preferences indicated by the user profile in response to the determination.

Some further embodiments are directed to various ways that the user profile can be created, and how later changes to the user's profile can cause updated settings configuration information to be generated and communicated to the user equipment node for use in reconfiguring the settings of the corresponding application that installed on the user equipment node.

Figure 10:
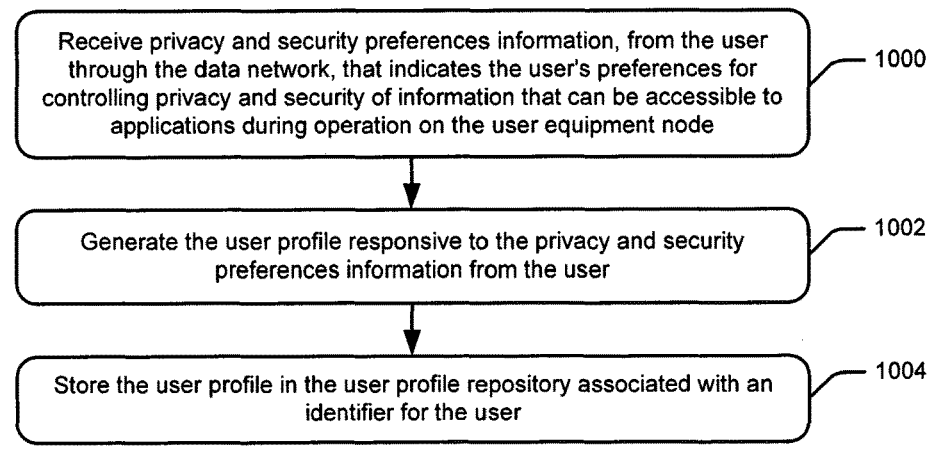

Referring to FIG. 10, privacy and security preferences information is received (block 1000) from the user through the data network 150, and which indicates the user's preferences for controlling privacy and security of information that can be accessible to applications during operation on the user equipment node 120. The user profile is generated (block 1002) responsive to the privacy and security preferences information from the user. The user profile is stored (block 1004) in the user profile repository 106 associated with an identifier for the user.

In a further embodiment, the privacy and security preferences information can be received (block 1000) responsive to the user logging into a subscriber account and initiating generation of the user profile, which can then initiate operations for obtaining the privacy and security preferences information from the user by generation of question prompts that are sent to the user, and responsive answers that are received from the user through the data network 150 and the user equipment node 120 operated by the user.

Figure 11:
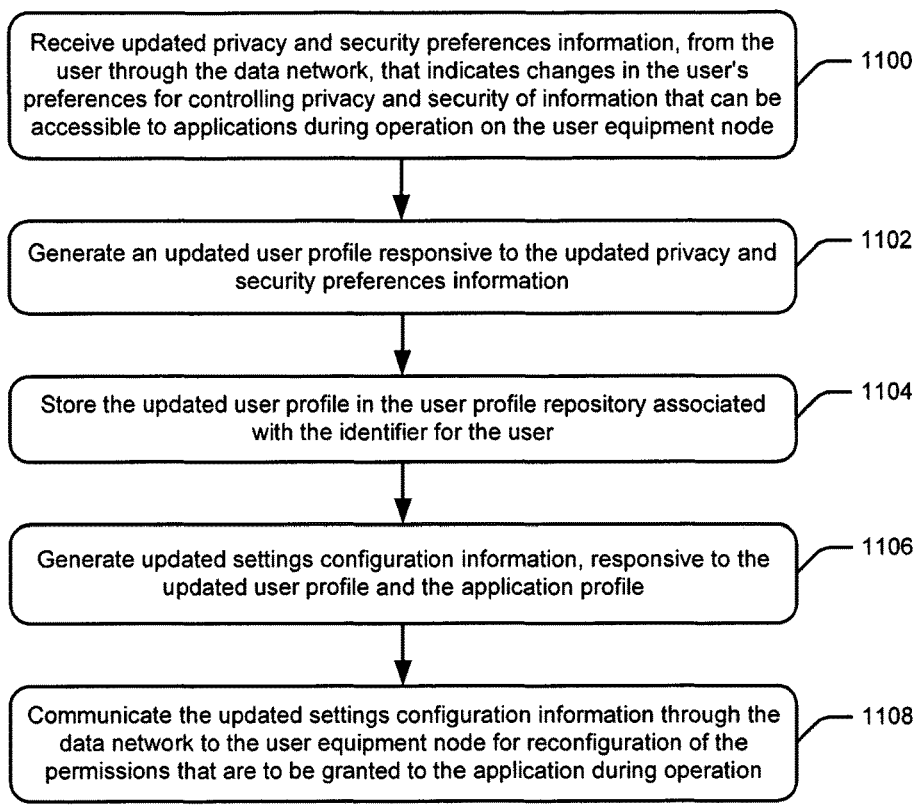

Referring to FIG. 11, updated privacy and security preferences information is received (block 1100) from the user through the data network 150, that indicates changes in the user's preferences for controlling privacy and security of information that can be accessible to applications during operation on the user equipment node 120. An updated user profile is generated (block 1102) responsive to the updated privacy and security preferences information. The updated user profile is stored (block 1104) in the user profile repository 106 associated with the identifier for the user. Updated settings configuration information is generated (block 1106) responsive to the updated user profile and the application profile. The updated settings configuration information is communicated (block 1108) through the data network 150 to the user equipment node 120 to cause the user equipment node 120 to reconfigure the permissions (application settings) that are to be granted to the application during operation.

Figure 12:
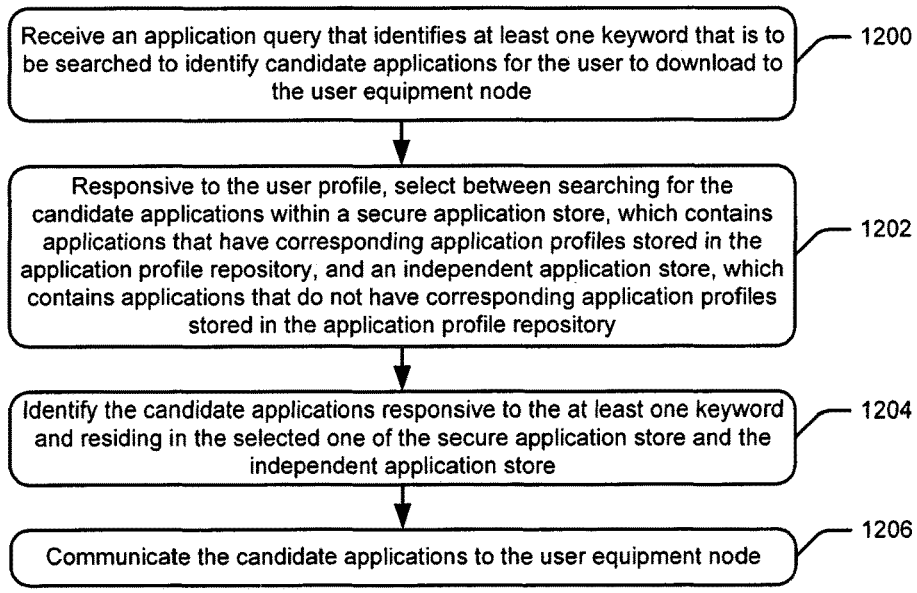

Some further embodiments are directed to operations and methods for controlling the application query controller 108 to select between querying the independent application store 160 and the secure application store 110 depending upon the user's profile. Referring to FIG. 12, an application query is received (block 1200) that identifies at least one keyword that is to be searched to identify candidate applications for the user to download to the user equipment node 120. Responsive to the user profile, a selection (block 1202) is made between searching for the candidate applications within the secure application store 110, which contains applications that have corresponding application profiles stored in the application profile repository (104), and the independent application store 160, which contains applications that do not have corresponding application profiles stored in the application profile repository 104. The candidate applications are identified (block 1204) responsive to the at least one keyword and residing in the selected one of the secure application store and the independent application store. The candidate applications are communicated (block 1206) to the user equipment node 120.

Figure 13:
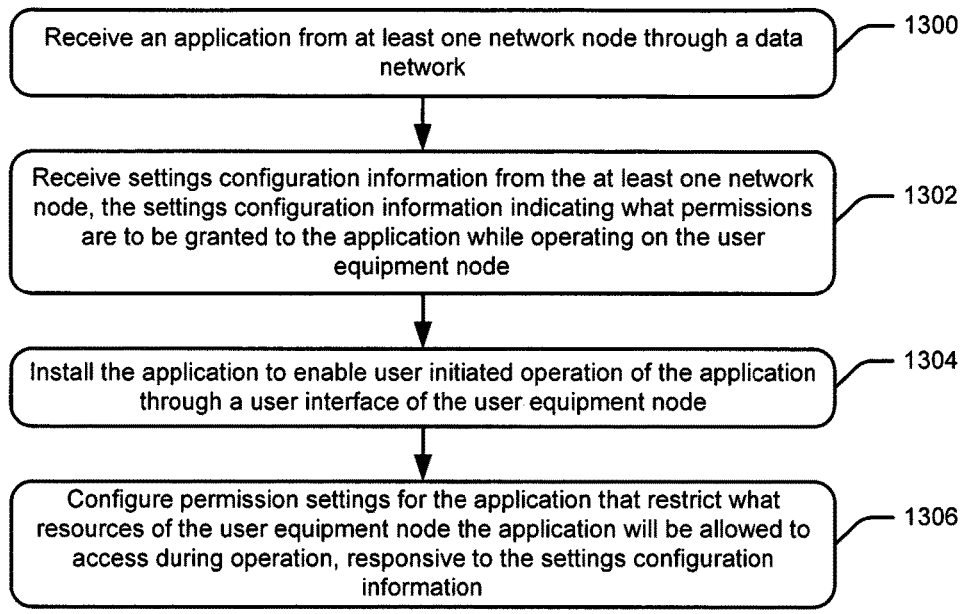
FIGS. 13-14 are flowcharts of operations and methods performed by a user equipment node to configure permission settings of an application, according to some embodiments.

Some further embodiments are directed to corresponding operations and methods by a user equipment node 120 to control operation of applications on a user equipment node 120. Referring to FIG. 13, an application is received (block 1300) from at least one network node 100 through a data network 150. Settings configuration information is received (block 1302) from the at least one network node 100, where the settings configuration information indicates what permissions are to be granted to the application while operating on the user equipment node 120. The application is installed (block 1304) to enable user initiated operation of the application through a user interface of the user equipment node 120. The permission settings are configured (1306) for the application, responsive to the settings configuration information, to restrict what resources of the user equipment node 120 the application will be allowed to access during operation.

Figure 14:
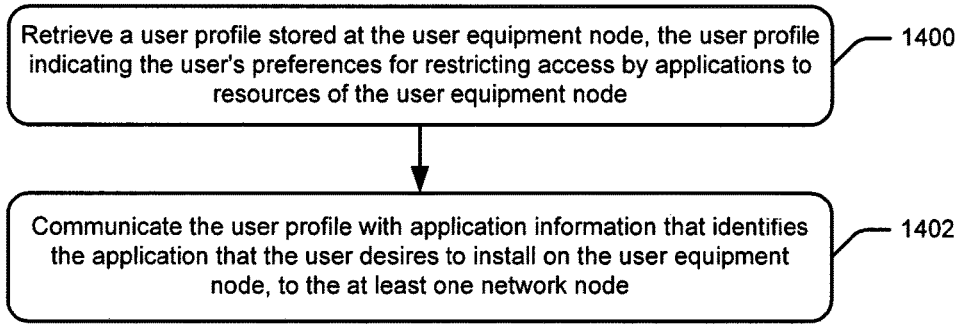

Although some embodiments are described above in which the user profile is stored at a network node (e.g. the user profile repository 106), in another embodiment the user profile is stored on the user equipment node 120. Referring to FIG. 14, the operations and methods include retrieving (block 1400) a user profile that is stored at the user equipment node 120. The user profile indicates the user's preferences for restricting access by applications to resources of the user equipment node 120. The user profile and application information, which identifies the application that the user has selected for installation on the user equipment node 120, is communicated (block 1402) to the at least one network node 100.

Example User Equipment Node

The user equipment node can be any type of electronic device that can receive applications from a network node via a data network, and can control operation of the application on the user equipment node. User equipment nodes can include, but are not limited to, fixed/mobile/transportable terminals (e.g., smart phones and tablet computers), televisions, gaming consoles, and desktop computers.

Referring again to FIG. 1, the example user equipment node 120 includes a processor circuit 122, memory circuitry/devices 124, and one or more network interfaces 134. The one or more network interfaces 134 can include a cellular transceiver 136, a wired network interface 138, a wireless local area network transceiver 140, a Bluetooth transceiver 140, and/or a near field communication transceiver 140.

The processor circuit 122 may include one or more data processing circuits, such as a general purpose and/or special purpose processor (e.g., microprocessor and/or digital signal processor). The processor circuit 122 is configured to execute computer program instructions from functional modules in the memory devices 124, described below as a computer readable medium, to perform some or all of the operations and methods that are described above for one or more of the embodiments disclosed herein, such as the embodiments of FIGS. 1-14. The functional modules can include an application installation module 126, an application settings module 130, applications 128, and user data 132.

The application installation module 126 is configured to install an application, which is received via the one or more network interfaces 134, for operation on the user equipment node 120 (e.g., execution by the processor 122). The application settings module 130 configures permission settings for the application that restrict what resources of the user equipment node 120 the application will be allowed to access during operation, responsive to the settings configuration information. The applications 128 may include one or more applications that are downloaded from the secure application store 110 and/or the independent application store 160. The user data 132 may include, for example, contact information (e.g. phonebook), application data, and other information items that may be treated as resources who's access privileges by particular ones of the applications is controlled by the settings configuration information received from the system 100 with the corresponding applications.

The user equipment node 120 may include a user input interface 142, display device 144, a speaker 146, and/or a microphone 148, one or more of which may be treated as resources who's access privileges by particular ones of the applications is controlled by the settings configuration information received from the system 100 with the corresponding applications.

Figure 15:
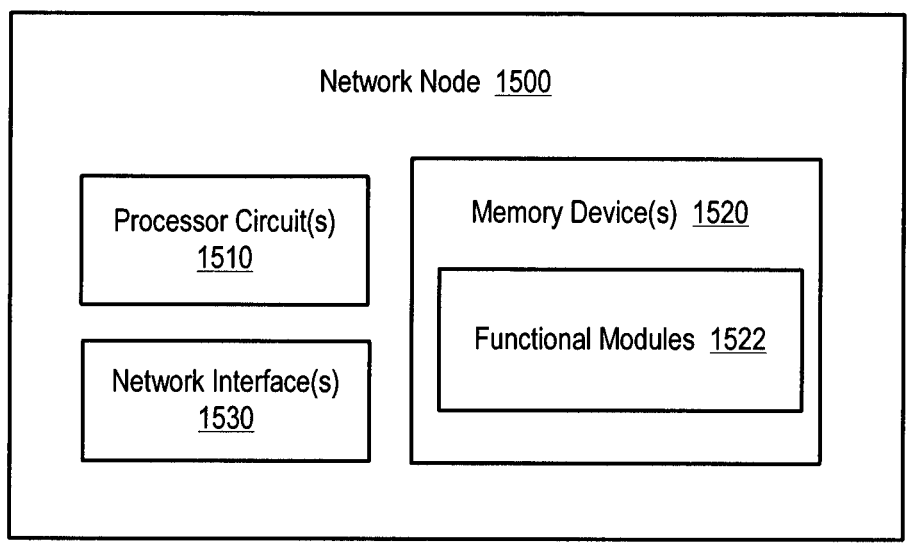
FIG. 15 is a block diagram of an example network node in an application control system, which is configured to operate according to some embodiments.

Example Network Node:

FIG. 15 is a block diagram of an example network node 1500, which may be used for the application installation in settings controller 102, the application query controller 108, the application profile repository 104, the user profile repository 106, the secure application store 110, and/or the independent application store 160. The network node 1500 can include one or more network interfaces 1530, processor circuitry 1510, and memory circuitry/devices 1520 that contain functional modules 1522. The processor circuitry 1510 may include one or more data processing circuits, such as a general purpose and/or special purpose processor (e.g., microprocessor and/or digital signal processor). The processor circuitry 1510 is configured to execute computer program instructions from the functional modules 1522 in the memory circuitry/devices 1520, described below as a computer readable medium, to perform some or all of the operations and methods that are described above for one or more of the embodiments disclosed herein, such as the embodiments of FIGS. 1-14.

Further Definitions and Embodiments:

In the above-description of various embodiments of the present invention, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense expressly so defined herein.

When an element is referred to as being "connected", "coupled", "responsive", or variants thereof to another element, it can be directly connected, coupled, or responsive to the other element or intervening elements may be present. In contrast, when an element is referred to as being "directly connected", "directly coupled", "directly responsive", or variants thereof to another element, there are no intervening elements present. Like numbers refer to like elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or" or "/" includes any and all combinations of one or more of the associated listed items.

As used herein, the terms "comprise", "comprising", "comprises", "include", "including", "includes", "have", "has", "having", or variants thereof are open-ended, and include one or more stated features, integers, elements, steps, components or functions but does not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the non-transitory computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of the present invention may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Many variations and modifications can be made to the embodiments without substantially departing from the principles of the present invention. All such variations and modifications are intended to be included herein within the scope of the present invention.

The invention claimed is:

1. A method by at least one network node of an application control system for controlling operation of applications on a user equipment node, the method comprising:
receiving an application request transmitted by the user equipment node, the application request comprising user information that identifies a user of the user equipment node and application information that identifies a selected application that the user of the user equipment node has selected for installation on the user equipment node;
in response to receiving the application request, retrieving a user profile for the user of the user equipment node from among a plurality of user profiles in a user profile repository using the user information included in the application request to identify the user profile, the user profile comprising user preference information that indicates preferences of the identified user of the user equipment node for restricting access by applications to resources of the user equipment node, said user preference information comprising restricted resource information identifying a restricted resource of the user equipment node;
retrieving an application profile from among a plurality of application profiles in an application profile repository using the application information to identify the application profile, the application profile comprising information about the selected application, the information about the selected application comprising information identifying a set of resources of the user equipment node that the selected application is operable to use during operation, wherein said set of resources includes the restricted resource identified by the restricted resource information included in the user preference information;
generating settings configuration information specifically for the selected application using the preferences of the identified user of the user equipment node and the information about the application, wherein the generated settings configuration information is configured to prevent the application from using the restricted resource identified by the restricted resource information included in the user preference information; and
communicating the application and the generated settings configuration information through a data network to the user equipment node for installation of the application and preventing the application from using the restricted resource when the application is run on the user equipment device, wherein
the user preference information comprises privacy and security preference information,
the application profile indicates a plurality of modes of operation of the application, each of the modes of operation having a different group of resources that the application will access, and
generating the settings configuration information, responsive to the user profile and the application profile comprises:
selecting among the modes of operation of the application indicated by the application profile, responsive to the user's preferences indicated by the user profile; and
generating the settings configuration information to indicate that a selected mode of operation which uses a corresponding group of resources is permitted to be granted to the application while operating on the user equipment node.

2. The method of claim 1, further comprising:
receiving the application and the settings configuration information at the user equipment node;
installing the application to enable user initiated operation of the application through a user interface of the user equipment node; and
using the settings configuration information to configure permission settings for the selected application, wherein the configured permission settings indicate that the selected application is prohibited from using the restricted resource, thereby preventing the application from using the restricted resource.

3. The method of claim 1, wherein:
the application profile further indicates first, second, and third modes of operation, the first mode of operation of the application provides more functionality than the second and third modes of operation of the application, and the first mode of operation of the application uses a first group of the resources that is a superset that includes second and third groups of the resources used, respectively, by the second and third modes of operation of the application.

4. The method of claim 1, wherein generating the settings configuration information, responsive to the user profile and the application profile further comprises:
generating the settings configuration information to indicate that a non-selected one or more modes of operation using a corresponding one or more groups of resources are not permitted to be granted to the application while operating on the user equipment node.

5. The method of claim 1, further comprising:
determining that none of the modes of operation of the application indicated by the application profile satisfy the user's preferences indicated by the user profile; and
communicating a message through the data network to the user equipment node informing the user that none of the modes of operation of the application indicated by the application profile satisfy the user's preferences indicated by the user profile in response to the determination.

6. The method of claim 1, further comprising:
receiving the privacy and security preferences information, from the user through the data network, that indicates the user's preferences for controlling privacy and security of information that can be accessible to applications during operation on the user equipment node;
generating the user profile responsive to the privacy and security preferences information from the user; and
storing the user profile in the user profile repository associated with an identifier for the user.

7. The method of claim 6, wherein receiving privacy and security preferences information, from the user through the data network, that indicates the user's preferences for controlling privacy and security of information that can be accessible to applications during operation on the user equipment node, comprises:
responding to the user logging into a subscriber account and initiating generation of the user profile, by obtaining the privacy and security preferences information from the user by generating question prompts to the user and receiving responsive answers from the user through the data network and the user equipment node operated by the user.

8. The method of claim 6, further comprising:
receiving updated privacy and security preferences information, from the user through the data network, that indicates changes in the user's preferences for controlling privacy and security of information that can be accessible to applications during operation on the user equipment node;
generating an updated user profile responsive to the updated privacy and security preferences information;
storing the updated user profile in the user profile repository associated with the identifier for the user;
generating updated settings configuration information, responsive to the updated user profile and the application profile; and
communicating the updated settings configuration information through the data network to the user equipment node for reconfiguration of the permissions that are to be granted to the application during operation.

9. The method of claim 1, further comprising:
receiving an application query that identifies at least one keyword that is to be searched to identify candidate applications for the user to download to the user equipment node;
responsive to the user profile, selecting between searching for the candidate applications within a secure application store, which contains applications that have corresponding application profiles stored in the application profile repository, and an independent application store, which contains applications that do not have corresponding application profiles stored in the application profile repository;
identifying the candidate applications responsive to the at least one keyword and residing in the selected one of the secure application store and the independent application store; and
communicating the candidate applications to the user equipment node.

10. A method by a user equipment node for controlling operation of applications on the user equipment node, the method comprising:
causing a network node to generate and store a user profile for a user of the user equipment node, the user profile comprising user preference information that indicates the user's preferences for restricting access by applications to resources of the user equipment node, said user preference information comprising information identifying a restricted resource, wherein causing the network node to generate and store the user profile for the user comprises transmitting to the network node the user preference information, wherein the transmitted user preference information further comprises privacy and security preferences information that indicates the user's preferences for controlling privacy and security of information that can be accessible to applications during operation on the user equipment node;
transmitting to a network node an application request comprising user information that identifies the user of the user equipment node and application information that identifies a selected application that the user has selected for installation on the user equipment node;
receiving the selected application from at least one network node through a data network, wherein the application is operable to operate in a plurality of modes of operation including a first mode of operation in which the application is configured to use a first set of resources and a second mode of operation in which the application is configured to use a subset of said first set of resources, wherein at least one resource is included in the first set of resources but is not included in the subset of said first set of resources;
receiving, from the at least one network node, settings configuration information generated specifically for the application, wherein the setting configuration information generated specifically for the application was generated using the identified user's preferences and an application profile comprising information identifying each one of the plurality of modes of operation in which the application is operable to operate, and the settings configuration information that was generated specifically for the application comprises compatibility information specifying: i) that the second mode of operation is compatible with the identified user's preferences and ii) that the first mode of operation is incompatible with the identified user's preferences;
installing the application to enable user initiated operation of the application through a user interface of the user equipment node; and
using the setting configuration information, configuring permission settings for the application such that the permission settings for the application restrict the application from operating in the first mode of operation but do not restrict the application from operating in the second mode of operation.

11. The method of claim 10, further comprising:
retrieving a user profile stored at the user equipment node, the user profile indicating the user's preferences for restricting access by applications to resources of the user equipment node; and
communicating the user profile with application information that identifies the application that the user has selected for installation on the user equipment node, to the at least one network node.

12. A network apparatus for controlling operation of applications on a user equipment node, the network apparatus comprising:
a user profile repository that stores a plurality of user profiles;
an application profile repository that stores a plurality of application profiles; and
controller circuitry arranged to:
receive an application request transmitted by the user equipment node, the application request comprising user information that identifies a user of the user equipment node and application information that identifies a selected application that the user of the user equipment node has selected for installation on the user equipment node;
in response to receiving the application request, retrieve a user profile for the user of the user equipment node from among the plurality of user profiles in the user profile repository using the user information included in the application request to identify the user profile, the user profile comprising user preference information that indicates preferences of the identified user of the user equipment node for restricting access by applications to resources of the user equipment node, said user preference information comprising restricted resource information identifying a restricted resource of the user equipment node;

retrieve an application profile from among the plurality of application profiles in the application profile repository using the application information to identify the application profile, the application profile comprising information about the selected application, the information about the selected application comprising information identifying a set of resources of the user equipment node that the selected application is operable to use during operation, wherein said set of resources includes the restricted resource identified by the restricted resource information included in the user preference information;

generate settings configuration information specifically for the selected application using preferences of the identified user of the user equipment node and the information about the application, wherein the generated settings configuration information is configured to prevent the application from using the restricted resource identified by the restricted resource information included in the user preference information; and communicate the application and the generated settings configuration information through a data network to the user equipment node for installation of the application and preventing the application from using the restricted resource when the application is run on the user equipment device, wherein the user preference information comprises privacy and security preference information, the application profile indicates a plurality of modes of operation of the application, each of the modes of operation having a different group of resources that the application will access, and the controller circuitry generates the settings configuration information by performing a process comprising:

selecting one or more of said plurality of mode of operation based on the identity of the restricted resource included in the user profile, wherein each one of the selected modes of operation is configured to use the restricted resource; and generating the settings configuration information such that the settings configuration information indicates that that the selected one more modes of operation are prohibited modes of operation, thereby preventing the application from using the restricted resource.

13. The network apparatus of claim 12, wherein:

the application profile indicates a plurality of modes of operation of the application, each of the modes of operation having a different group of resources that the application will access, and the controller circuitry generates the settings configuration information by performing a process comprising:

determining that each of the plurality of modes of operation is configured to use the restricted resource; and as a result of determining that each of the plurality of modes of operation is configured to use the restricted resource, generating the settings configuration information such that the settings configuration information indicates that each of the plurality of modes of operation is a prohibited mode of operation, thereby preventing the application from using the restricted resource.

14. The network apparatus of claim 12, wherein the controller circuitry is further configured to:

receive the privacy and security preferences information, from the user through the data network, that indicates the user's preferences for controlling privacy and security of information that can be accessible to applications during operation on the user equipment node;

generate the user profile responsive to the privacy and security preferences information from the user; and store the user profile in the user profile repository associated with an identifier for the user.

15. The network apparatus of claim 14, wherein:

the controller circuitry responds to the user logging into a subscriber account and initiating generation of the user profile, by obtaining the privacy and security preferences information from the user by generating question prompts to the user and receiving responsive answers from the user through the data network and a user equipment node operated by the user.

16. The network apparatus of claim 14, wherein the controller circuitry is further configured to:

receive updated privacy and security preferences information, from the user through the data network, that indicates changes in the user's preferences for controlling privacy and security of information that can be accessible to applications during operation on the user equipment node;

generate an updated user profile responsive to the updated privacy and security preferences information from the user;

store the updated user profile in the user profile repository associated with the identifier for the user;

generate updated settings configuration information, responsive to the updated user profile and the application profile; and communicate the updated settings configuration information through the data network to the user equipment node for reconfiguration of the permissions that are to be granted to the application during operation.

17. The network apparatus of claim 12, wherein the controller circuitry is further configured to:

receive an application query that identifies at least one keyword that is to be searched to identify candidate applications for the user to download to the user equipment node;

respond to the user profile by selecting between searching for applications within a secure application store, which contains applications that have corresponding application profiles stored in the application profile repository, and an independent application store, which contains applications that do not have corresponding application profiles stored in the application profile repository;

identify candidate applications responsive to the at least one keyword in the selected one of the secure application store and the independent application store; and communicate the candidate applications to the user equipment node.

* * * * *